US012747992B2

(12) United States Patent
Gebhardt et al.

(10) Patent No.: US 12,747,992 B2
(45) Date of Patent: Sep. 29, 2026

(54) TEMPERATURE SENSOR ASSEMBLY AND SYSTEM

(71) Applicant: ABB Schweiz AG, Baden (CH)

(72) Inventors: Joerg Gebhardt, Mainz (DE); Wilhelm Daake, Petershagen (DE); Karsten Schroeder, Petershagen (DE); Guruprasad Sosale, Munich (DE); Patric Ackermann, Griesheim (DE); Subhashish Dasgupta, Bangalore (IN)

(73) Assignee: ABB Schweiz AG, Baden (CH)

( * ) Notice: Subject to any disclaimer, the term of this patent is extended or adjusted under 35 U.S.C. 154(b) by 265 days.

(21) Appl. No.: 18/644,321

(22) Filed: Apr. 24, 2024

(65) Prior Publication Data

US 2024/0361187 A1 Oct. 31, 2024

(30) Foreign Application Priority Data

Apr. 26, 2023 (EP) .................................... 23170117

(51) Int. Cl.
*G01K 1/143* (2021.01)
*G01K 1/08* (2021.01)

(52) U.S. Cl.
CPC ............... *G01K 1/143* (2013.01); *G01K 1/08* (2013.01)

(58) Field of Classification Search
CPC ............ G01K 1/026; G01K 1/08; G01K 1/18; G01K 1/143; G01K 13/02
See application file for complete search history.

(56) References Cited

U.S. PATENT DOCUMENTS

| | | | | |
|---|---|---|---|---|
| 2020/0225096 | A1* | 7/2020 | Ude | G01K 7/427 |
| 2023/0030690 | A1* | 2/2023 | Gebhardt | G01K 1/16 |
| 2024/0426678 | A1* | 12/2024 | Von Dosky | G01K 15/005 |

FOREIGN PATENT DOCUMENTS

| | | | |
|---|---|---|---|
| DE | 102018119857 | A1 | 2/2020 |
| DE | 102021209278 | A1 | 3/2023 |
| EP | 4063815 | A1 | 9/2022 |
| EP | 4130694 | A1 | 2/2023 |
| WO | WO 2019/063519 | A1 | 4/2019 |
| WO | WO 2020/035260 | A1 | 2/2020 |

OTHER PUBLICATIONS

European Patent Office, Extended European Search Report in European Patent Application No. 23170117.8, 8 pp. (Sep. 29, 2023).

* cited by examiner

*Primary Examiner* — Randy W Gibson
(74) *Attorney, Agent, or Firm* — Fitch Even Tabin & Flannery LLP

(57) ABSTRACT

A temperature sensor assembly configured to determine a temperature of a surface of a vessel wall, comprising: a housing and a head element, wherein the head element is removably arranged on the housing; a first thermal rod comprising a temperature measurement sensor; and/or a second thermal rod, comprising a reference temperature sensor; wherein the first thermal rod and the second thermal rod are connected to the head element such that the first thermal rod and/or the second thermal rod are removable from the housing with the head element.

13 Claims, 14 Drawing Sheets

TEMPERATURE SENSOR ASSEMBLY AND SYSTEM

CROSS-REFERENCE TO RELATED APPLICATIONS

The instant application claims priority to European Patent Application No. 23170117.8, filed Apr. 26, 2023, which is incorporated herein in its entirety by reference.

FIELD OF THE DISCLOSURE

The present disclosure generally relates to a temperature sensor assembly configured to determine a temperature of a surface of a vessel wall for use in industrial processes.

BACKGROUND OF THE INVENTION

Determination of temperatures is vital for safe running of facilities, as being one of the main control parameters for process control. Ensuring that temperature measurements of process media are accurate and repeatable is critical. For determination of a temperature of a medium within a vessel and/or of the vessel wall, surface temperature sensors are placed at a surface of a wall of the vessel in order to measure the temperature of this surface, and respectively determine the temperature of the medium at the other side of the wall. Such devices are known for example from WO2019063519A1, WO2020035260A1, EP4063815A1 and EP4130694A1. The surface temperature sensors must be fixed or pressed to the surface in a very reliable and reproducible manner. This is relevant to create a definite thermal contact between wall surface and a thermometer rod or thermal rod, and to have a definite situation for temperature measurement.

BRIEF SUMMARY OF THE INVENTION

There is a need to provide reliable temperature measurements in industrial processes. The present disclosure describes systems and methods for measuring temperature using a temperature assembly.

An aspect of the present disclosure relates to a temperature sensor assembly configured to determine a temperature of a surface of a vessel wall, comprising: a housing and a head element, wherein the head element is removably arranged on the housing. A first thermal rod, comprising a temperature measurement sensor; and/or a second thermal rod, comprising a reference temperature sensor; wherein the first thermal rod and the second thermal rod are connected to the head element, such that the first thermal rod and/or the second thermal rod are removable from the housing with the head element.

The term "removably" here and in the following means non-destructively, i.e. without damaging any parts, and reversibly, i.e. the part, here the head element, can be put in place again afterwards and is then essentially in the same state as before the removal. Typical options to realize this are thread-type connections, clamps, force fitting. For example, the head element may be removed by loosening a screw joint or a hook, thereby releasing a spring which is pressing the first thermal rod and/or the second thermal rod onto a thermal contact area to make contact to the surface of the vessel wall. Other embodiments, which accomplish the described feature, may also be possible.

BRIEF DESCRIPTION OF THE SEVERAL VIEWS OF THE DRAWING(S)

Figure 6:
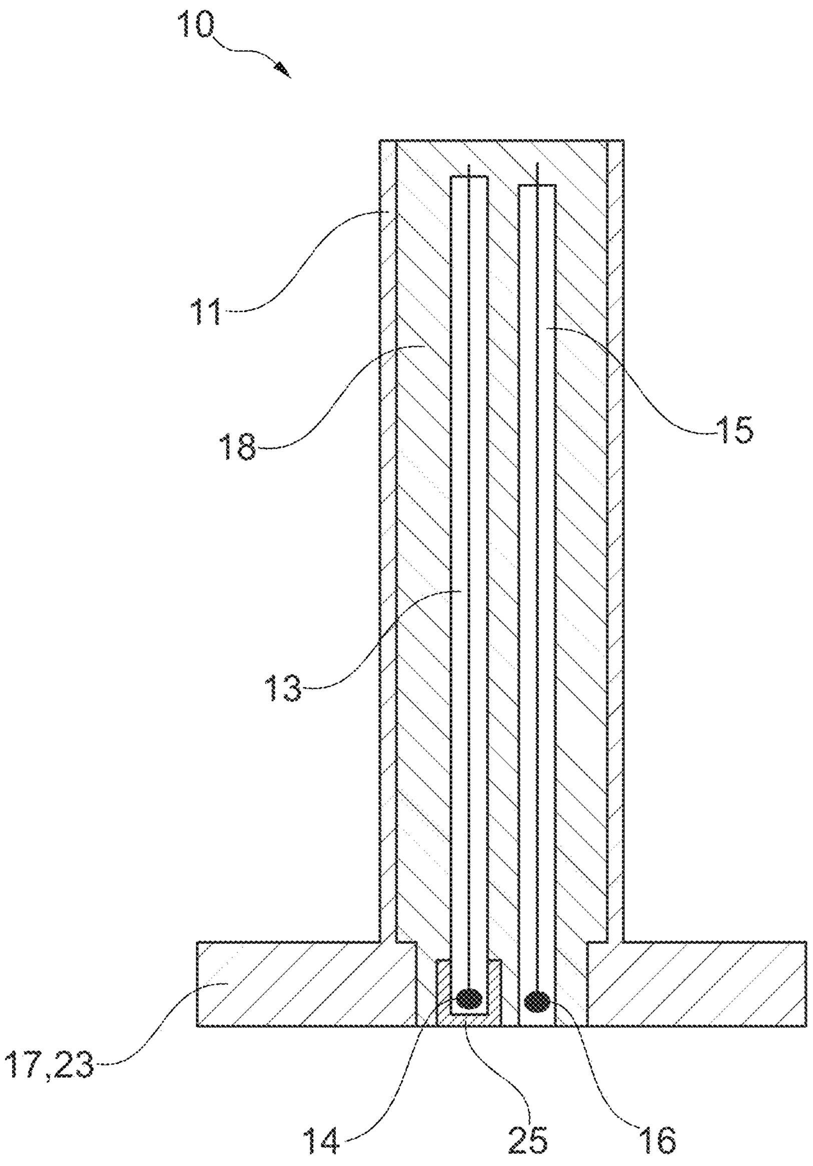

FIG. 6 a schematic drawing of another temperature sensor assembly in accordance with the disclosure.

Figure 7:
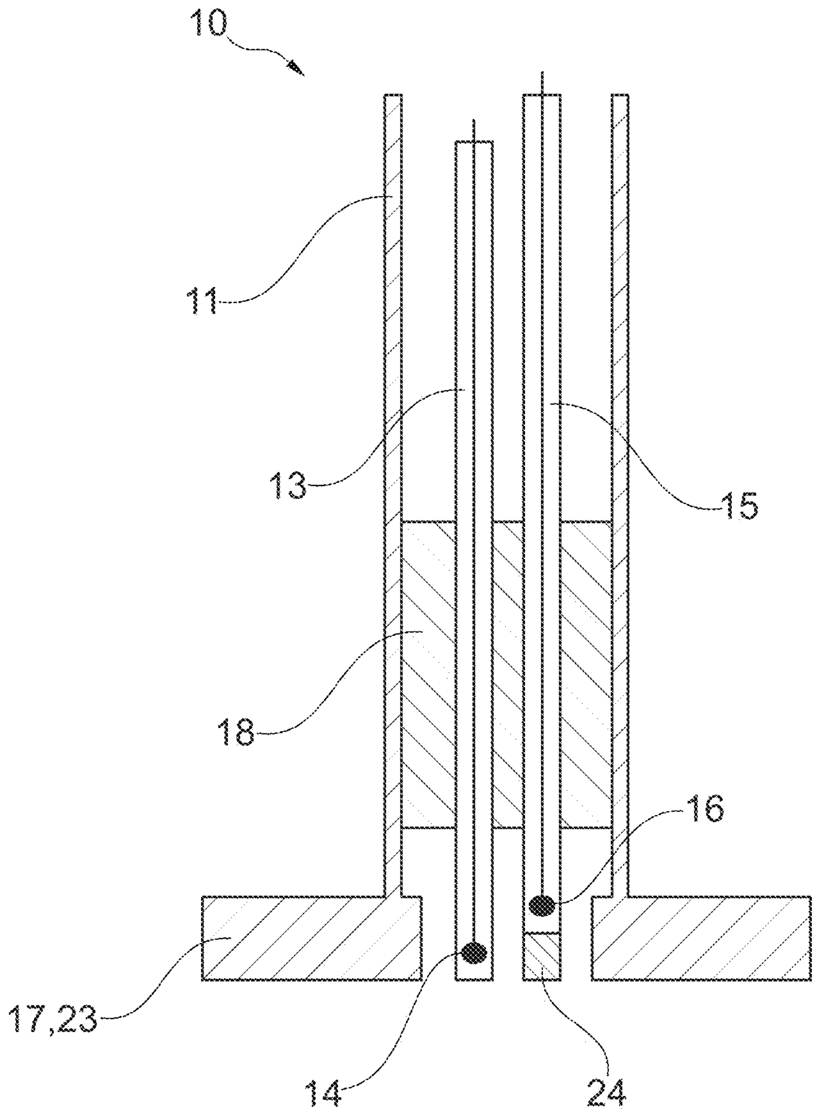

FIG. 7 is a schematic drawing of a temperature sensor assembly configured inside of a neck tube in accordance with the disclosure.

Figure 8:
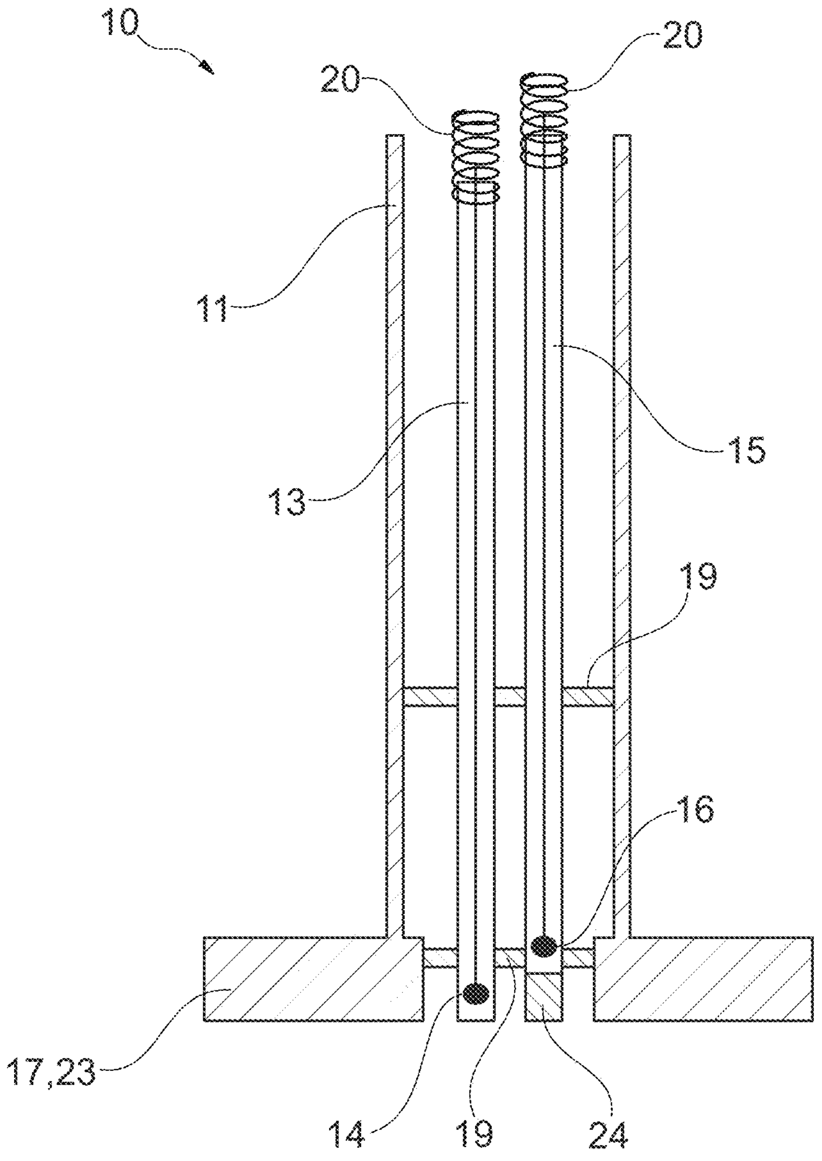

FIG. 8 is a schematic drawing of a temperature sensor assembly with a spring element in accordance with the disclosure.

Figure 9:
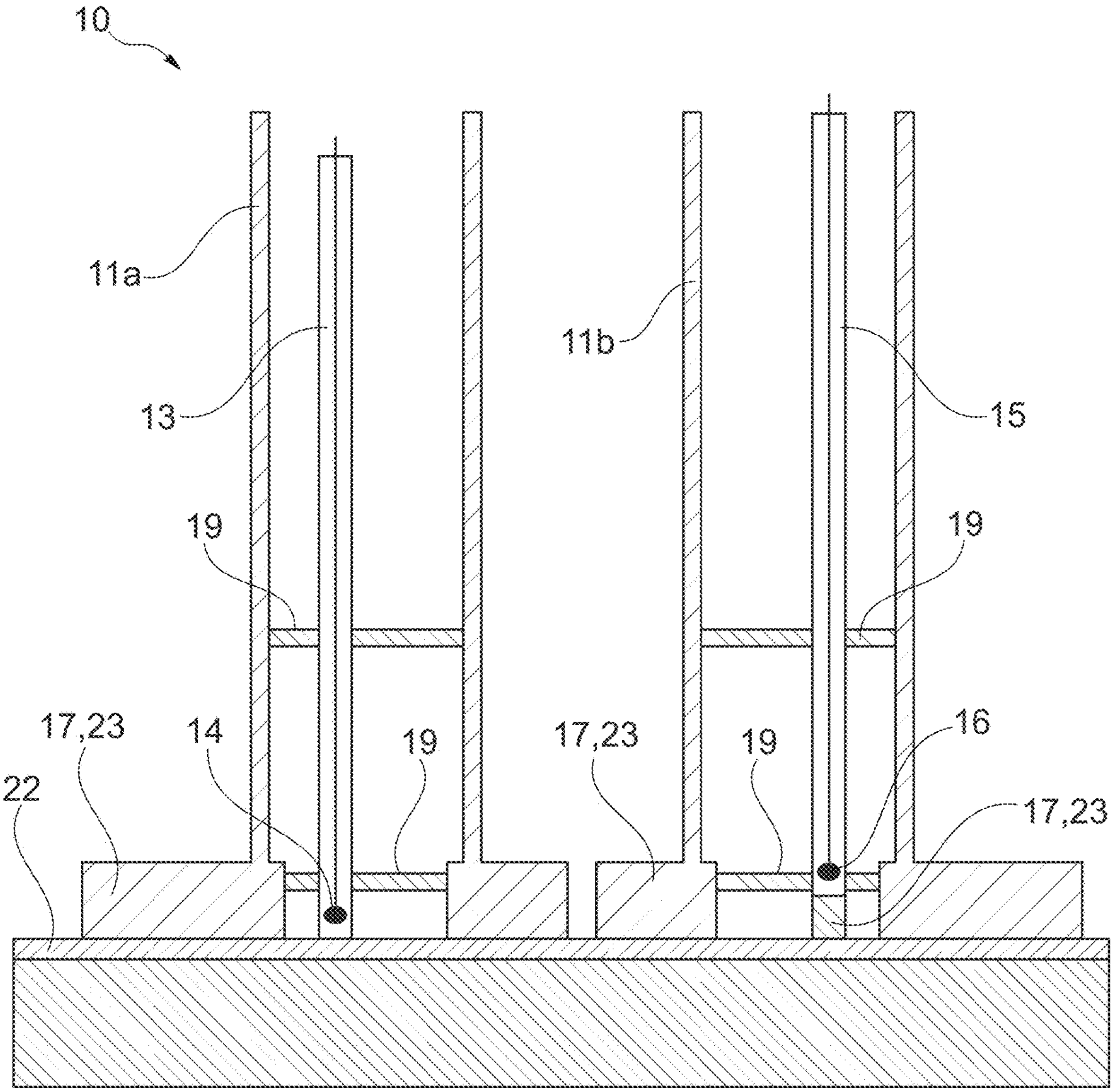

FIG. 9 is a schematic drawing of a temperature sensor assembly configured with two neck tubes in accordance with the disclosure.

Figure 10:
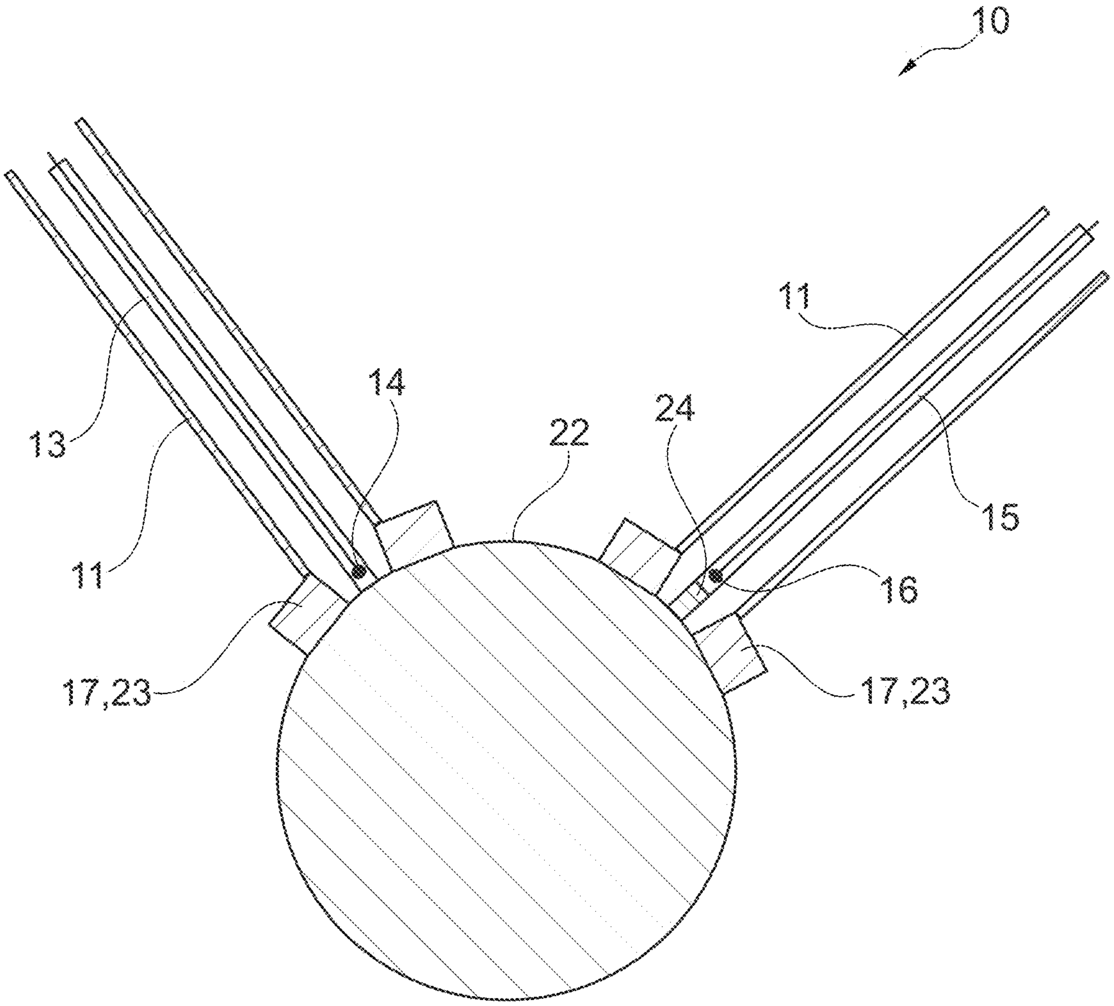

FIG. 10 a schematic drawing of a temperature sensor assembly attached to a pipe/tank perimeter in accordance with the disclosure.

Figure 11:
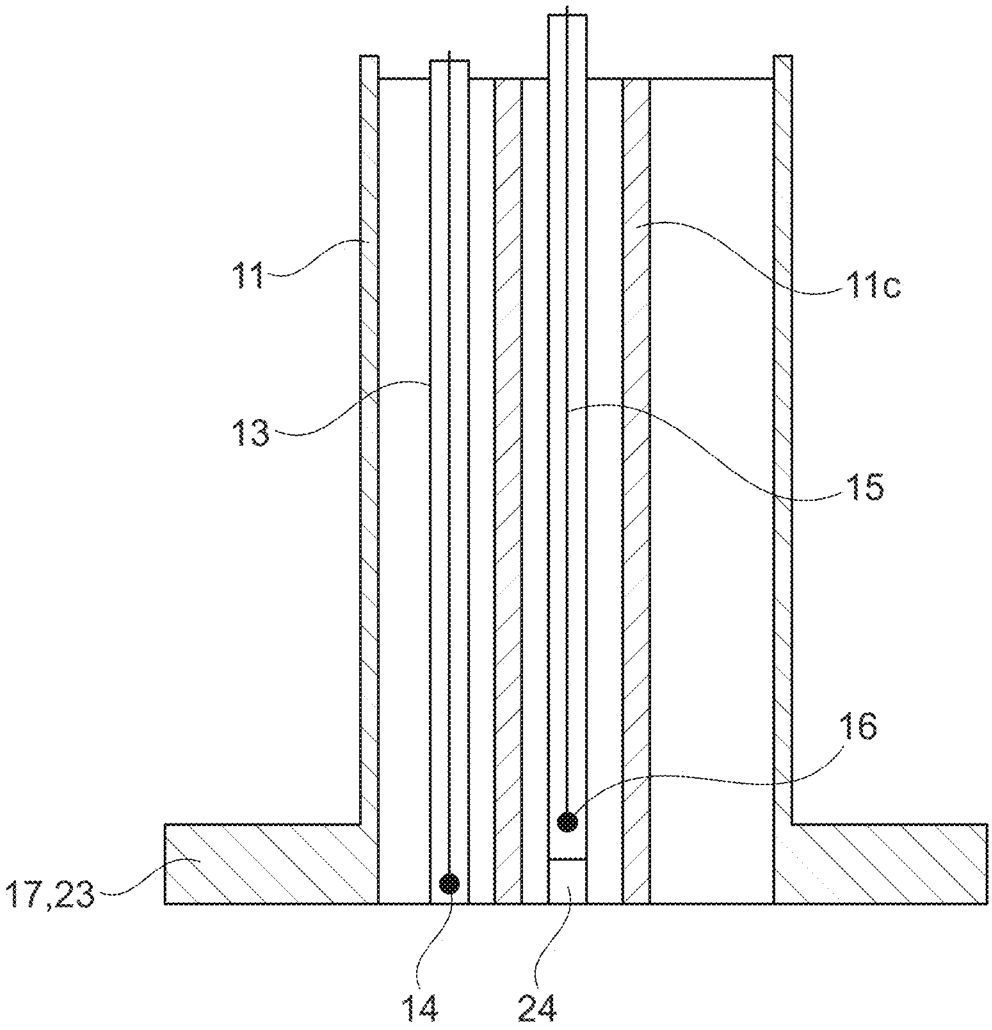

FIG. 11 a schematic drawing of an embodiment of one or more rods in an internal housing in accordance with the disclosure.

Figure 12:
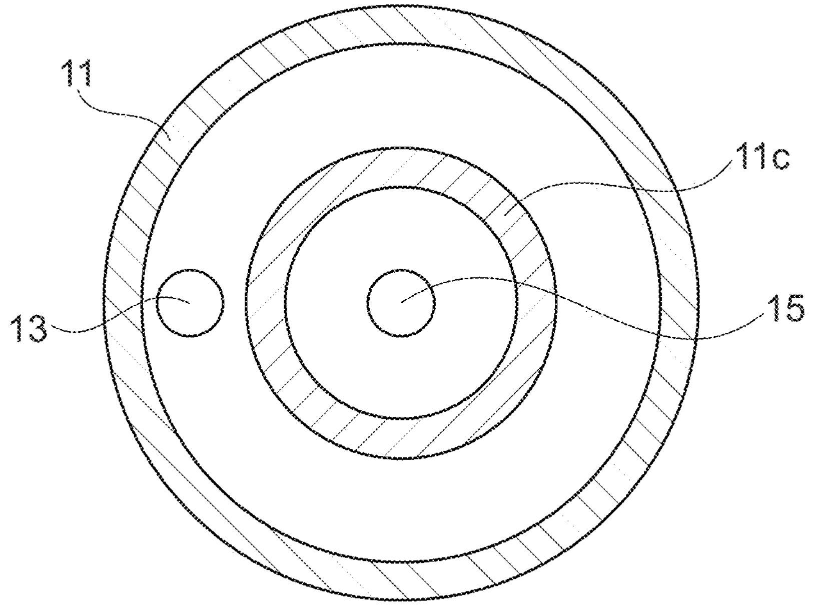

FIG. 12 is another schematic drawing of the embodiment shown in FIG. 11.

Figure 13:
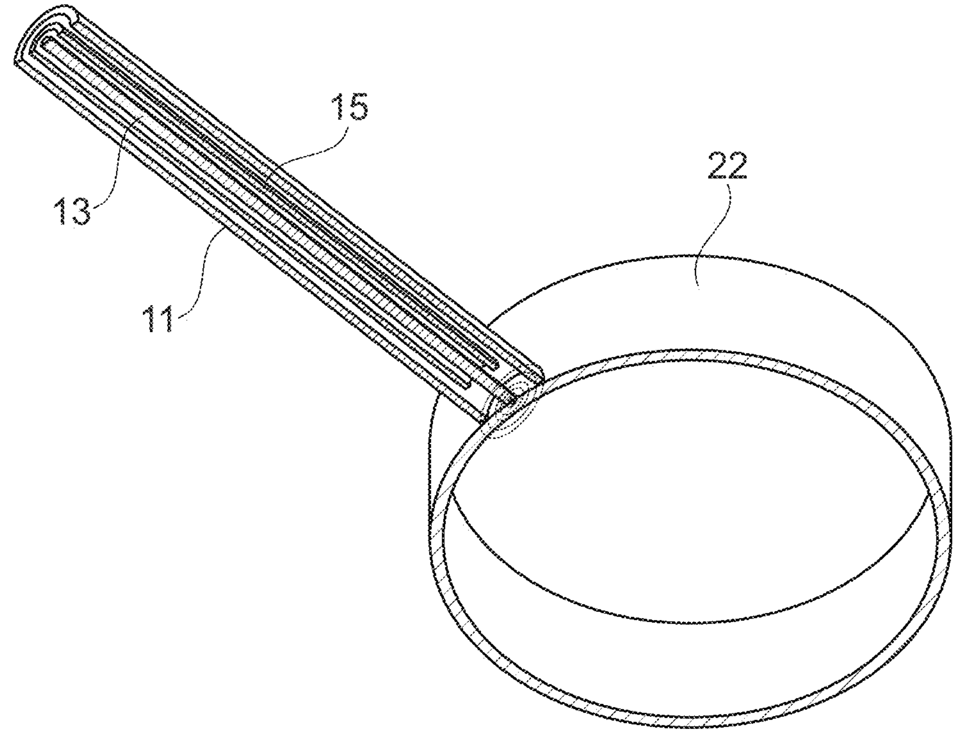

FIG. 13 is a schematic drawing of an embodiment with a hollow cylindrical thermal rod in accordance with the disclosure.

Figure 14:
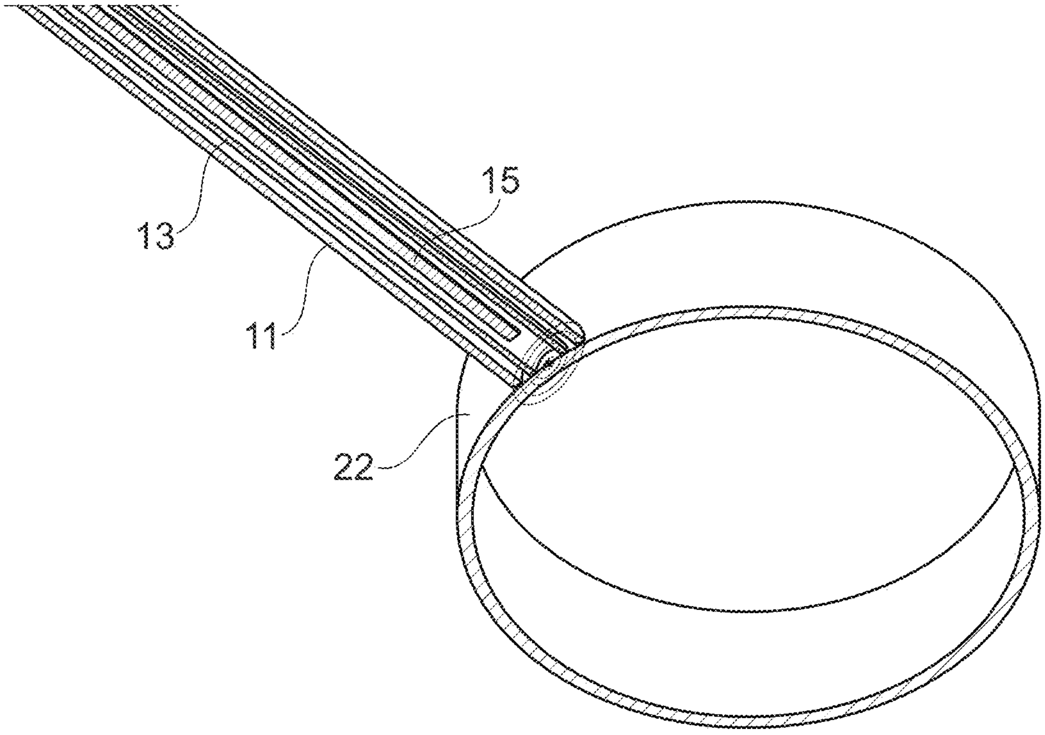

FIG. 14 is a schematic drawing of another embodiment with a hollow cylindrical rod in accordance with the disclosure.

Figure 15:
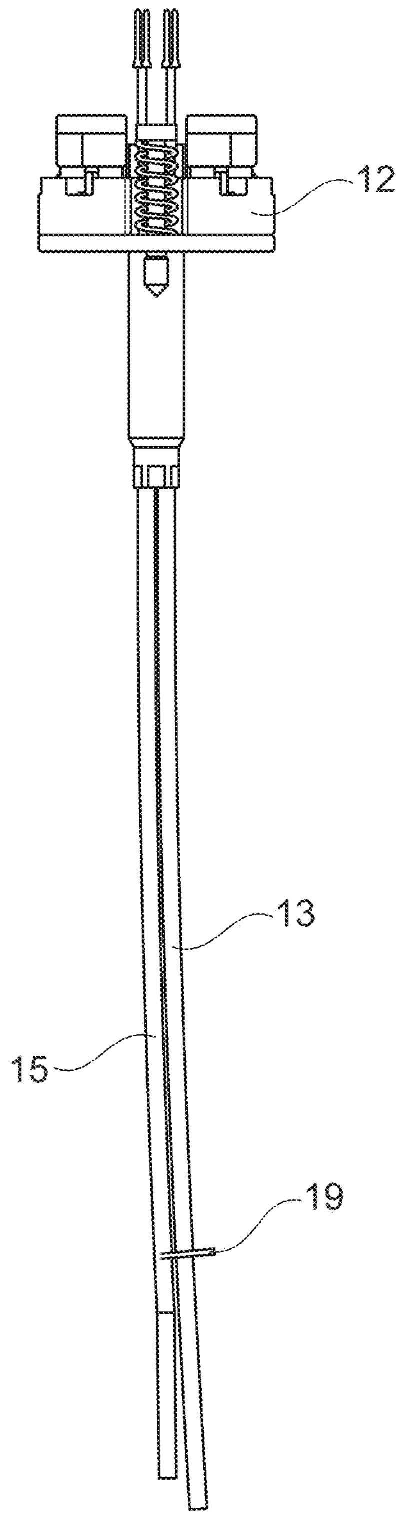

FIG. 15 is a schematic drawing of an assembly of rods which contains one or more bent rods which lead to a certain clamping stress inside the housing after mounting, in accordance with the disclosure.

DETAILED DESCRIPTION OF THE INVENTION

Figure 1:
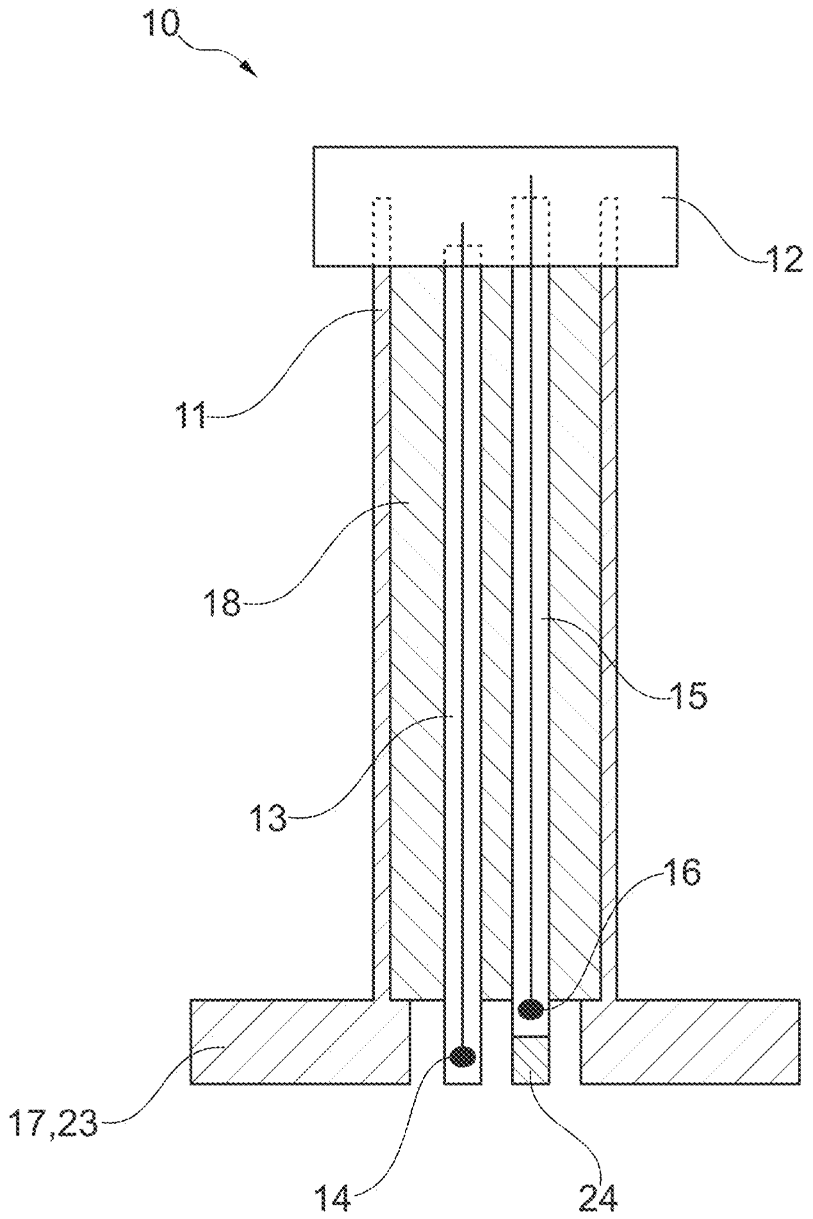
FIG. 1 is a schematic of a temperature sensor assembly in accordance with the disclosure.

FIG. 1 illustrates schematically a temperature sensor assembly 10 comprising a housing 11. At an axial end of the housing 11, a head element 12 is arranged. More precisely, the head element 12 is removable arranged or connected to the housing 11.

The housing 11 may comprise a cylindrical shape or geometry. The housing 11 may also be described as neck tube. Alternatively, other shapes may be possible. The housing 11 is filled with a filling material 18, in particular an insulating material 18 or gas, for example air. Other gases and/or materials may be possible.

The head element 12 comprises a first thermal rod 13 and a second thermal rod 15. In other words, the first and second thermal rods 13, 15 are connected to the head element 12 with an axial end. The first thermal rod 13 and the second thermal rod 15 are fixed to the head element 12, such that, in an assembled state, the first and second thermal rods 13,15 both extend inside the housing 11. More precisely, in an assembled state, the two thermal rods 13, 15 are completely surrounded by the housing 11. The first and second thermal rods 13, 15 are thermally decoupled from each other. The first thermal rod 13 and the second thermal rod 15 extend parallel to each other.

The first thermal rod 13 and the second thermal rod 15 are connected to the head element 12. When the head element 12 is removed from the housing 11, the first thermal rod 13 and the second thermal rod 15 are also removed from the housing 11. The first and second thermal rods 13, 15 may be removed from the housing 11 with the insulating material 18 or without the insulating material 18. The first thermal rod 13 and/or the second thermal rod 15 may be loosely held in place inside the housing 11 by the insulating material or other guiding elements. The first thermal rod 13 comprises a temperature measurement sensor 14. The temperature measurement sensor 14 is arranged in the area of the free end of the first thermal rod 13. The free end of the first thermal rod 13 is in contact with the surface of vessel wall 22.

The second thermal rod 15 comprises a reference temperature sensor 16. The reference temperature sensor 16 is arranged in the area of the free end of the second thermal rod 15. The second thermal rod 15 is not in contact with the vessel wall 22. The second thermal rod 22 comprises a tip element 24. The tip element 24 allows for a different thermal conductivity or thermal resistance between the reference temperature sensor 16 and the vessel wall 22 and the first thermal rod 13 and the vessel wall 22.

The head element 12 may comprise electronic components for analyzing or processing temperature data of the temperature sensors in the first thermal rod 13 and the second thermal rod 15, e.g. the head element 12 may comprise an analyzing device.

The housing 11 is connected to the vessel wall 22 by an adapter element 23. The adapter element 23 may be arranged at the vessel wall 22 by a clamp element or a similar structure. The adapter element 23 is configured to hold the housing 11 such that the head element 12 with the first thermal rod 13 and the second thermal rod 15 can be removed without removing the housing 11 and/or the adapter element 23.

Figure 2:
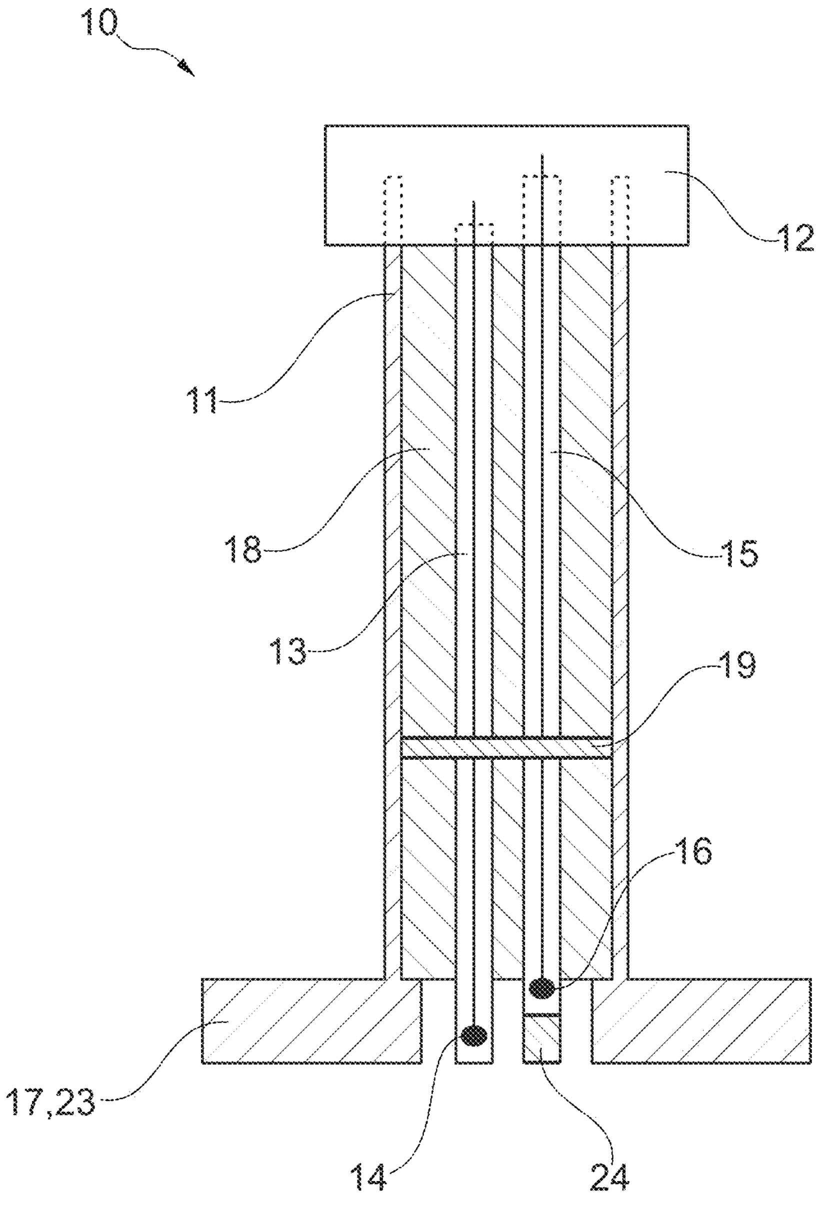
FIG. 2 is a schematic of an alternative embodiment for a temperature assembly in accordance with the disclosure.

FIG. 2 illustrates another temperature sensor assembly 10. The temperature sensor assembly 10 is similar to the one as shown in FIG. 1, but with the difference that a coupling element 19 is arranged at the first thermal rod 13 and the second thermal rod 15. It is possible, that only the first and/or the second thermal rod 13, 15 are connected to the coupling element 19. The coupling element 19 allows to keep the first and second thermal rods 13, 15 thermally decoupled. The coupling element 19 also allows to fasten the first and second thermal rods 13, 15 by a force fitting inside the housing 11. The coupling element 19 may be designed as a pinhole plate 19. Other forms or designs may also be used.

Figure 3:
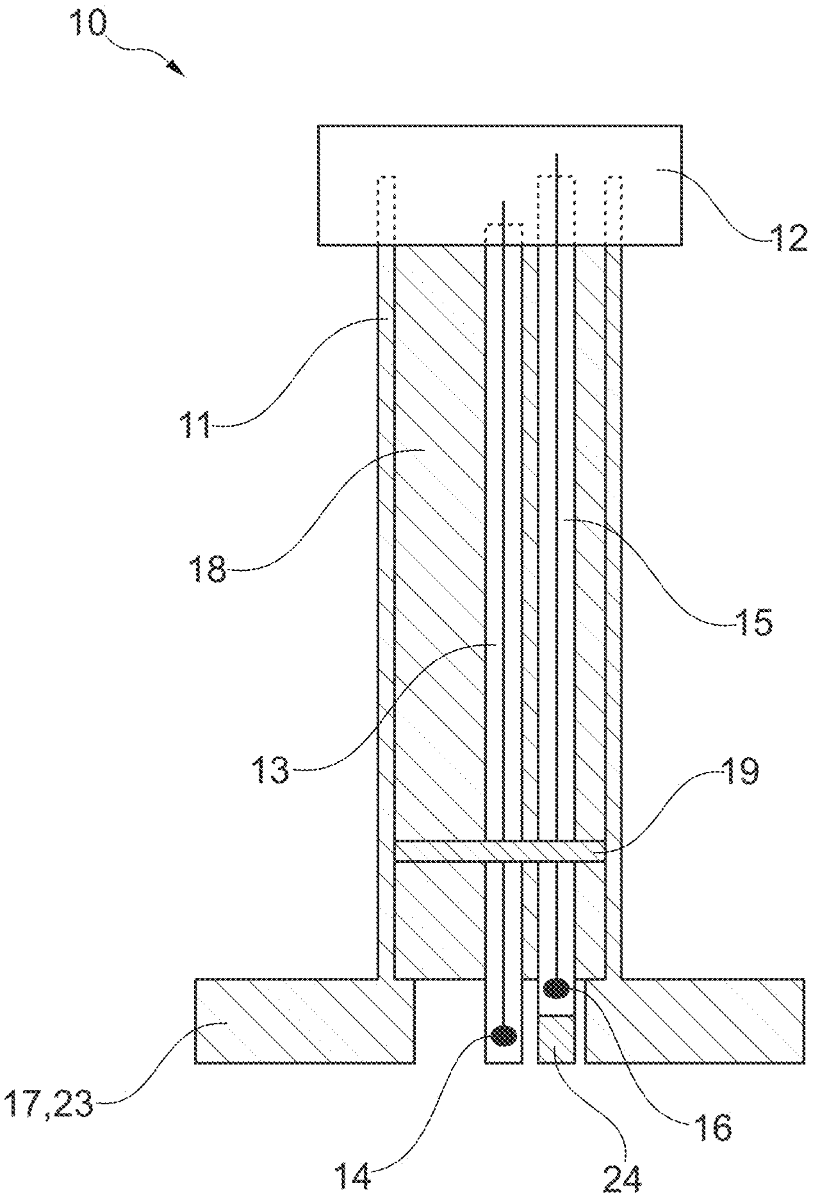
FIG. 3 is a schematic of another alternative embodiment for a temperature assembly in accordance with the disclosure.

FIG. 3 illustrates another temperature sensor assembly 10. The temperature sensor assembly 10 is similar to the one as shown in FIG. 2. The first thermal rod 13 extends along a center longitudinal axis of the housing 11. The second thermal rod 15 is arranged eccentric, next to the first thermal rod 13.

Figure 4:
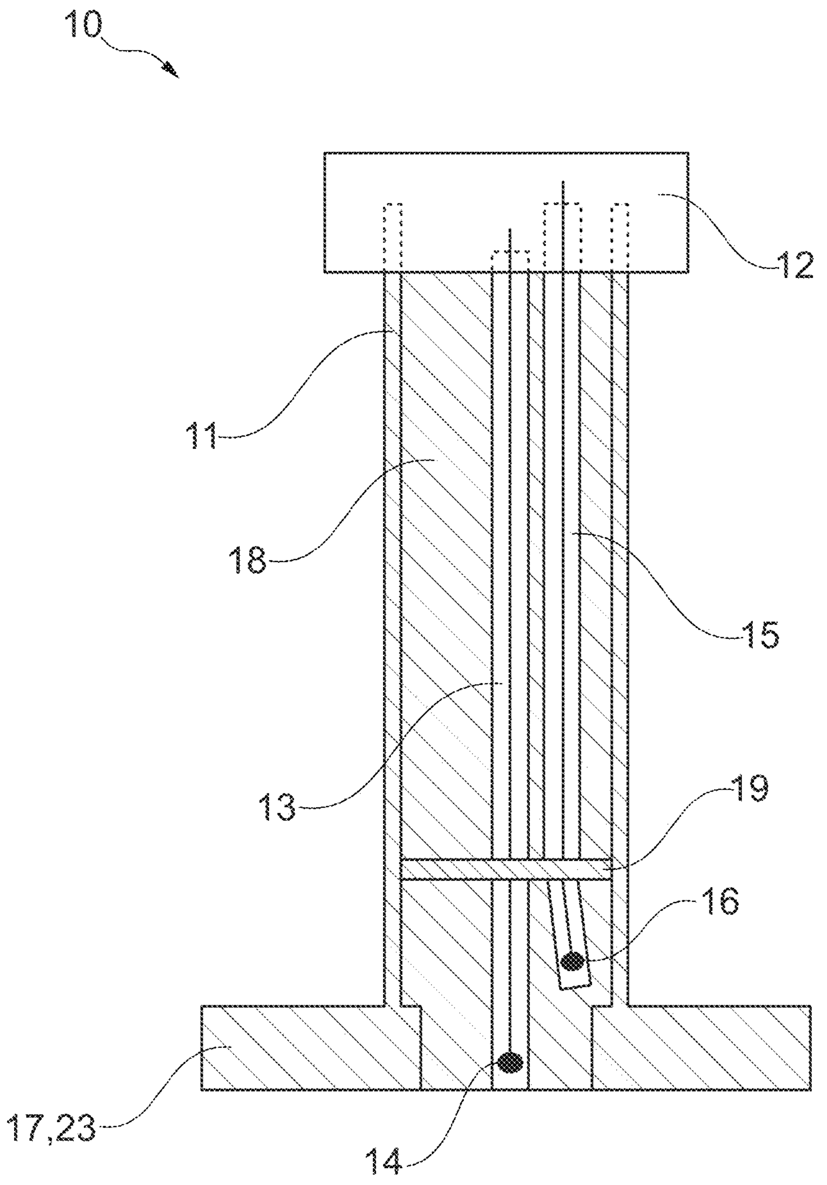
FIG. 4 is a schematic of another alternative embodiment for a temperature sensor assembly in accordance with the disclosure.

FIG. 4 illustrates another temperature sensor assembly 10. The temperature sensor assembly 10 is similar to the one as shown in FIG. 3, but with the difference, that the free end of the second thermal rod 15 comprises a bent or a curvature away from the first thermal rod 13. This is an advantage in terms of thermal decoupling.

Figure 5:
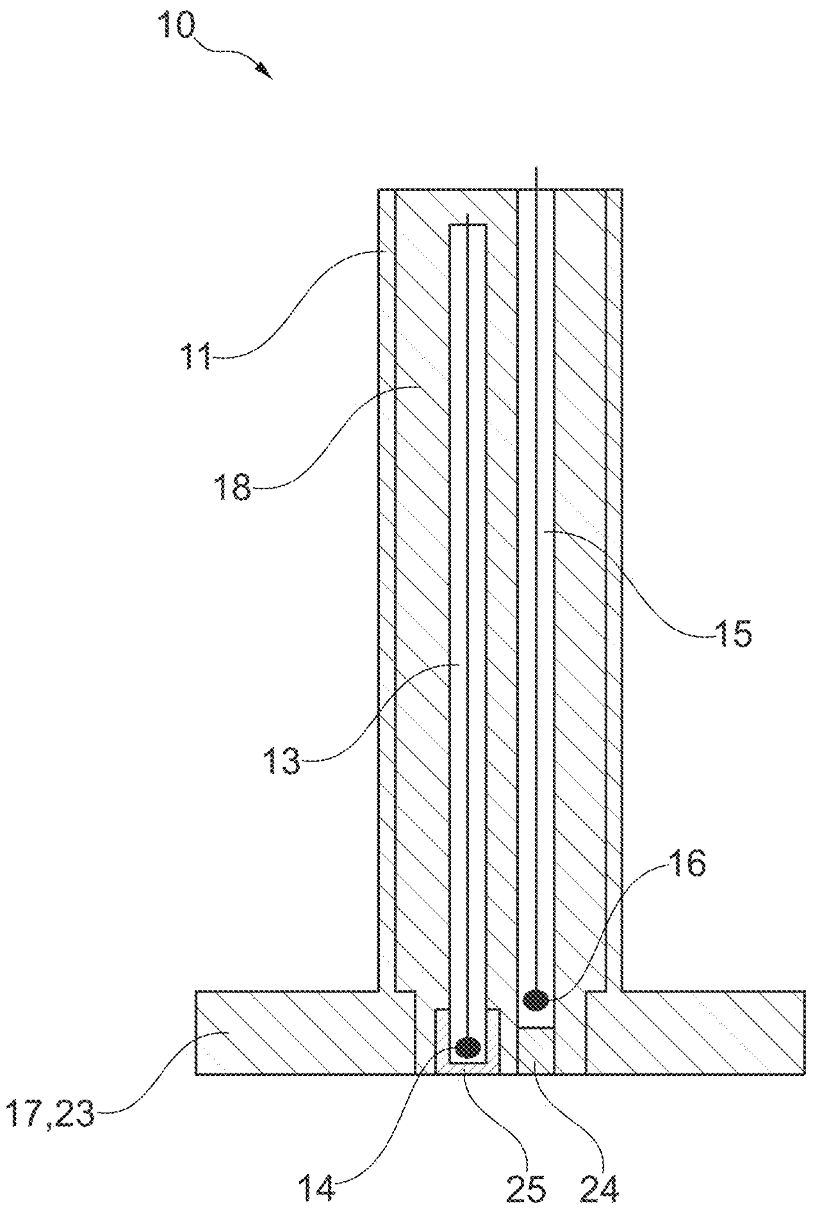
FIG. 5 is a schematic drawing of another temperature sensor assembly in accordance with the disclosure.

FIG. 5 illustrates another temperature sensor assembly 10. The temperature sensor assembly 10 is similar to the one as shown in FIG. 2, but with the difference, that the tip or axial end of the first thermal rod 13 comprises a cap element 25 comprising highly thermal conducting material for improving the thermal coupling between the temperature measurement sensor 14 of the first thermal rod 13 and the surface of the vessel wall 22.

FIG. 6 illustrates a further temperature sensor assembly 10. The temperature sensor assembly 10 is similar to the one shown in FIG. 5, but the tip or the free axial end of the second thermal rod 15 is directly thermally coupled to the surface of the vessel wall 22. The first thermal rod 13 comprises the cap element 25. The cap element 25 has a different thermal conductivity and is beneficial for the thermal decoupling of the second thermal rod 15 from the vessel wall 22. The cap element 25 may have a high thermal conductivity for improving the temperature measurement by decreasing the thermal resistance between the surface of the vessel wall 22 and the temperature sensor.

FIG. 7 illustrates a further temperature sensor assembly 10 similar to the temperature sensor assembly 10 as shown in FIG. 1, but wherein the housing 11 is filled only partially with an insulating material 18. The insulating material 18 may be used to fix the position of the first and second thermal rods 13, 15. This means, the insulating material 18 may be fixed to the housing 11, but not to the two thermal rods 13, 15. The housing 11 is at least partially filled with air. Preferably, the housing 11 is filled with a material whose thermal conductivity is at most a factor of 2 greater than that of air.

FIG. 8 illustrates another temperature sensor assembly 200 similar to the temperature sensor assembly 10 as shown in FIG. 7, but without the insulating material. To mechanically fix the first and second thermal rod 13, 15 within the housing 11, two coupling elements 19 are provided, which are only weakly thermally conductive. The coupling elements 19 are not connected to the first and second thermal rods 13, 15. The first and second thermal rods 13, 15 are guided through respective holes of the coupling element 19 without being fixed/fastened to the coupling element 19. Additionally, the first and the second thermal rods 13, 15, which may be formed as standard thermometer rods, are coupled to the surface of the vessel wall 22 mechanically by a spring elements 20 to provide spring-loaded mechanical contacts.

FIG. 9 illustrates another temperature sensor assembly 10, wherein the first thermal rod 13 is arranged within a first housing 11*a* and the second thermal rod 15 is arranged within a second housing 11*b*. The thermal coupling of the first thermal rod 13 and the thermal coupling of the second thermal rod 15 are each configured as shown in FIG. 1.

FIG. 10 illustrates how the temperature sensor assembly 10 as shown in FIG. 9 may be arranged on a curved surface of the vessel wall 22.

FIG. 11 and FIG. 12 illustrate an embodiment wherein the first thermal rod 13 and the second thermal rod 15 are arranged in two housings. Inside the housing 11, an inner housing 11*c* is arranged. The housing 11 and the inner housing 11*c* are concentrically to each other. The second thermal rod 15 is arranged in the inner housing 11*c*. The first thermal rod 13 is arranged in an annular gap between the inner housing 11*c* and the housing 11. More precisely, the first thermal rod 13 is arranged eccentrically from the second thermal rod 15.

In other words, the housing 11 may contain this internal or inner housing 11*c* with the first and second thermal rods, and possibly one or more other rods. The internal or inner housing 11*c* may be assembled concentrically to the external housing. The internal or inner housing 11*c* may be in mechanical contact to the surface of the vessel wall 22, whose temperature is to be measured, or not.

FIG. 13 and FIG. 14 illustrates further embodiments. In FIG. 13 the second thermal rod 15 has a hollow cylindrical geometry, wherein the first thermal rod 13 is arranged concentrically inside the second thermal rod 15. The first thermal rod 13 is in contact with a surface of the vessel wall 22. The second thermal rod 15 is distanced from the vessel wall 22.

FIG. 14 illustrates the reverse case of FIG. 13. In FIG. 14, the first thermal rod 13 comprises a hollow cylindrical geometry and the second thermal rod 15 is arranged coaxial inside the first thermal rod 13. The first thermal rod 13 is in contact with a surface of the vessel wall 22. The second thermal rod 15 inside the first thermal rod 13 is distanced to the vessel wall 22.

FIG. 15 illustrates an embodiment, wherein the first thermal rod 13 is bent away from the second thermal rod 15. To put it another way, the first thermal rod 13 and the second thermal rod 15 do not extend along an axis parallel to a longitudinal axis of the housing 11 (the housing is not shown in FIG. 15).

In an assembled state, the first thermal rod 13 and second thermal rod 15 are bent or inclined towards an inner surface of the housing 11. The bent and inclined features allow to create a tension against the housing 11. More precisely, the coupling element 19, which is connected to one or both thermal rods 13, 15 is pressed against an inner surface of the housing 11. This allows to fix the first thermal rod 13 and/or the second thermal rod 15 inside the housing 11 by a force fit. When the head element 12 is removed from the housing 11, the thermal rods 13, 15 are removed with the head element 12. The coupling element 19 is also removed with the thermal rods 13, 15, when the head element 12 is removed. The head element 12 and the first and second thermal rod 13, 15 with the coupling element 19 can be inserted back into the housing 11 and connected or fastened to it.

The housing may be connected to the surface of the vessel wall. The housing is connected, pressed and/or attached to the surface, which temperature shall be measured. The housing may be designed as a neck tube. The neck tube may be connected to the vessel wall by an adapter, for example a clamp.

The first and second thermal rod may e.g. contain sensing elements such as resistive temperature sensors or thermocouple structures. Additionally, the first and second thermal rod may contain the conductors or wires to operate these sensor elements, together with means to electrically insulate these conductors against each other. Well-known mineral insulated stainless-steel—or copper-clad cables can be embodiments of such a thermal rods, which are well-known to a person skilled in the art.

The temperature sensor assembly according to the present invention is configured to be used with a surface of a vessel wall. A vessel may be a tube or a tank or a similar object which is designed to contain/carry a fluid. The term “fluid” includes liquid as well as gaseous substances.

The first thermal rod and the second thermal rod may also be described as thermometer rods. Both thermal rods may be essentially identical in construction. Alternatively, the rods may also be different.

The first thermal rod comprises the temperature measurement sensor to measure a temperature of the surface of the vessel wall or a temperature close to the surface of the vessel wall. The temperature measurement sensor may also be described as main temperature measurement sensor or contact temperature measurement sensor. The measured temperature may therefore be described as main temperature or contact temperature.

The second thermal rod comprises the reference temperature sensor to measure a reference temperature, e.g. in a small or a larger distance from the surface. The measured reference temperature can be used together with the main temperature of the temperature measurement sensor of the first thermal rod, to estimate the surface temperature of the vessel wall. If the surface temperature of the vessel wall is known, it may be used to determine the temperature inside the vessel.

The head element serves as a closure or cover for the housing. Furthermore, the head element may comprise the electronics for evaluating or analyzing the measured values of the sensors, e.g. an analyzing device, in the first and second thermal rods. A further housing structure configured to house the electronics of the assembly may also be remotely connected to the assembly, in particular the head element.

The first thermal rod and second thermal rod are both connected to the head element. The first and second thermal rod are not fixated inside the housing. The first and second rod element may be hold in place inside the housing, for example by a force fitting. This may be done by some clamping of the rods themselves inside the housing, or by clamping a coupling element, for example a pinhole plate, inside the housing, which, in turn, can have a form fitted, force-fitted, or welded connection to the first thermal rod and/or second thermal rod.

A further beneficial force-fitted structure is given by a slightly bent rod structure, either of the first rod and/or of the second rod. An embodiment of such a structure is shown in FIG. 13.

The first thermal rod and the second thermal rod are configured to be removed from the housing, when the head element is removed. Particularly beneficial is a removal which is possible in a non-destructive and reversible way.

In an embodiment, the first thermal rod and/or the second thermal rod, or a mechanical ensemble which contains both, is connected to the housing through a force fitting.

In an embodiment, the housing and the head element are connected by a force-fitting and/or form-fitting, in particular by a threading. Other connections may be possible, for example a bayonet lock. This allows to securely connect the head element to the housing.

In an embodiment, the temperature assembly is configured to be connected to the vessel wall by a connection element, in particular by a clamping means. Preferably, the housing is connected via the connection element. The connection element may also comprise an adapter element or a receptacle to connect the housing to the connection element.

In an embodiment, a filling material, e.g. an insulating material, is at least partially arranged inside of the housing. In an embodiment, it is possible to use air or another gas as filling material.

In an embodiment, a coupling element, in particular a pinhole plate, is arranged to the first thermal rod and/or the second thermal rod. The coupling element allows to keep the first and second thermal rods thermally decoupled and at a defined spatial space. The coupling element also allows to fasten the first and second thermal rods by a force fitting inside the housing. More precisely the coupling element holds the first and/or second thermal rod in position. The coupling element does not inhibit a removal of the rods from the housing.

The internal cross section of the housing is nowhere smaller than the cross section of the first thermal rod and/or the second thermal rod or the coupling element, for example a pinhole plate. The said structures can simply pass every cross section of the housing during removal. In other words, the inner cross section of the housing is larger, than the cross section of the coupling element.

In order to have the coupling element, in particular a pinhole fixed: It may also be oval or of elliptic shape and could be rotated to give a form fitted fixation. The coupling element, e.g. the pinhole plate, is configured to fit through every cross section of the housing.

In an embodiment, the first thermal rod extends essentially along a middle axis of the housing. In an embodiment, the second thermal rod extends at least partially parallel to the first thermal rod. In an embodiment, the first thermal rod/and/or the second thermal rod is at least in sections. This helps to ensure thermal decoupling of the two thermal rods. The bent structure may also help to force fit the thermal rods inside the housing, for example with the help of a coupling element. More specifically, the coupling element may be pressed against an inner surface of the vessel wall because auf the bent shape of the first and/or second thermal rod.

In an embodiment, the first thermal rod and/or the second thermal rod are/is pressed to the surface of the vessel by a spring element. The spring elements provide spring-loaded mechanical contacts of the thermal rods. This allows a constant contact pressure of the thermal rods, even when reassembling during maintenance. The spring element may comprise an elastic material, for example an elastomer, or a mechanical spring, for example a coil spring. Other suitable materials or components are possible.

In an embodiment, the first thermal rod and/or the second thermal rod comprises a hollow cylindrical shape, wherein the first thermal rod and the second thermal rod are arranged coaxial to each other. In other words, one thermal rod extend coaxially inside the other respective thermal rod.

In an embodiment, the first thermal rod is arranged in a first housing with a first head element and the second thermal rod is arranged in a second housing with a second head element. The first housing could also be enclosed by the other (e.g. essentially concentrically or eccentrically).

A further aspect of the present invention relates to a system for determining a temperature of a surface of a vessel wall, comprising: a temperature sensor assembly according to any of preceding embodiments; and an analyzing device, for determining the surface temperature of the vessel wall, wherein the temperature sensor assembly is electrically connected to the analyzing device; and a connection element configured to connect the temperature sensor assembly to the vessel wall, wherein the temperature sensor assembly is removable connected to the connection element by an adapter element.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and "at least one" and similar referents in the context of describing the invention (especially in the context of the following claims) are to be construed to cover both the singular and the plural, unless otherwise indicated herein or clearly contradicted by context. The use of the term "at least one" followed by a list of one or more items (for example, "at least one of A and B") is to be construed to mean one item selected from the listed items (A or B) or any combination of two or more of the listed items (A and B), unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

REFERENCES

10 temperature sensor assembly
11 housing
11*a* first housing
11*b* second housing
11*c* inner housing
12 head element
13 first thermal rod
14 temperature measurement sensor
15 second thermal rod
16 reference temperature sensor
17 connection element
18 filling material/insulating material
19 coupling element
20 spring element
22 vessel wall
23 adapter element
24 tip element
25 cap element

What is claimed is:

1. A temperature sensor assembly configured to determine a temperature of a surface of a vessel wall, comprising:

a housing and a head element, wherein the head element is removably arranged on the housing;

a first thermal rod comprising a temperature measurement sensor; and a second thermal rod comprising a reference temperature sensor;

wherein the first thermal rod and the second thermal rod are connected to the head element such that the first thermal rod and/or the second thermal rod are removable from the housing with the head element, wherein the first thermal rod and/or the second thermal rod are/is bent at least in sections.

2. The temperature sensor assembly according to claim 1, wherein the first thermal rod and the second thermal rod are connected to the housing through a force fitting.

3. The temperature sensor assembly according to claim 1, wherein the housing and the head element are connected by a force-fitting and/or form-fitting.

4. The temperature sensor assembly according to claim 1, wherein the housing and the head element are connected by a threaded connection.

5. The temperature sensor assembly according to claim 1, wherein the temperature assembly is configured to be connected to the vessel wall by a connection element comprising a clamping device.

6. The temperature sensor assembly according to claim 1, wherein a filling material is at least partially arranged inside of the housing, wherein the filling material is preferably an insulating material.

7. The temperature sensor assembly according to claim 1, wherein a coupling element comprising a pinhole plate is arranged to the first thermal rod and/or the second thermal rod.

8. The temperature sensor assembly according to claim 1, wherein the first thermal rod extends essentially along a middle axis of the housing.

9. The temperature sensor assembly according to claim 1, wherein the second thermal rod extends at least partially parallel to the first thermal rod.

10. A temperature sensor assembly configured to determine a temperature of a surface of a vessel wall, comprising:

a housing and a head element, wherein the head element is removably arranged on the housing;

a first thermal rod comprising a temperature measurement sensor; and a second thermal rod comprising a reference temperature sensor;

wherein the first thermal rod and the second thermal rod are connected to the head element such that the first thermal rod and/or the second thermal rod are removable from the housing with the head element, wherein the first thermal rod and/or the second thermal rod are/is pressed to the surface of the vessel wall by a spring element.

11. The temperature assembly according to claim 1, wherein the first thermal rod and/or the second thermal rod comprises a hollow cylindrical shape, and wherein the first thermal rod and the second thermal rod are arranged coaxial to each other.

12. The temperature sensor assembly according to claim 1, wherein the first thermal rod is arranged in a first housing with a first head element and the second thermal rod is arranged in a second housing with a second head element.

13. A system for determining a temperature of a surface of a vessel wall, comprising:

a temperature sensor assembly, comprising:

a housing and a head element, wherein the head element is removably arranged on the housing;

a first thermal rod comprising a temperature measurement sensor; and a second thermal rod comprising a reference temperature sensor;

wherein the first thermal rod and the second thermal rod are connected to the head element such that the first thermal rod and/or the second thermal rod are removable from the housing with the head element, wherein the first thermal rod and/or the second thermal rod are/is bent at least in sections;

an analyzing device for determining the surface temperature of the vessel wall, wherein the temperature sensor assembly is electrically connected to the analyzing device; and a connection element configured to connect the temperature sensor assembly to the vessel wall;

wherein the temperature sensor assembly is removable connected to the connection element by an adapter element.

* * * * *